United States Patent [19]
Bordener

[11] Patent Number: 5,906,875
[45] Date of Patent: May 25, 1999

[54] MOLD ASSEMBLY FOR CREATING A COUNTERTOP PRODUCT DISPLAYING A BUILT-UP EDGE AND METHOD FOR PRODUCING THE SAME

[75] Inventor: Robert Bordener, Bloomfield Hills, Mich.

[73] Assignee: Talon Surfaces LLC, Troy, Mich.

[21] Appl. No.: 08/925,282

[22] Filed: Sep. 8, 1997

[51] Int. Cl.$^6$ ................ B32B 3/02; B28B 7/34; B29D 5/00
[52] U.S. Cl. ............ 428/81; 428/130; 428/192; 249/91; 249/117; 249/134; 264/219; 264/241; 264/252
[58] Field of Search ................ 428/172, 192, 428/130, 81, 156; 294/45, 5, 328, 141; 264/45.1, 219, 255, 241, 252, 308, 309; 249/91, 117, 134, 198

[56] References Cited

U.S. PATENT DOCUMENTS

| | | | |
|---|---|---|---|
| 4,208,368 | 6/1980 | Egli | 264/45.5 |
| 4,318,952 | 3/1982 | Barker et al. | 428/172 |
| 4,698,001 | 10/1987 | Vismara | 425/4 R |
| 4,834,929 | 5/1989 | Dehoff et al. | 264/226 |
| 4,956,142 | 9/1990 | Mangone, Jr. | 264/318 |
| 5,064,585 | 11/1991 | Cooper et al. | 264/40.6 |
| 5,628,949 | 5/1997 | Bordener | 264/161 |

*Primary Examiner*—Donald Loney
*Attorney, Agent, or Firm*—Gifford, Krass, Groh, Sprinkle, Anderson & Citkowski, P.C.

[57] ABSTRACT

A mold assembly for creating a countertop product displaying a built-up edge, the mold assembly having a substantially flat and rectangular planar shaped base which is bounded by first, second, third and fourth interconnected sides to define an interior cavity capable of receiving a pour of a resinous material. A selected number of the interconnected sides, up to all four sides, have inwardly facing surfaces which are configured to produce a countertop product exhibiting a built-up and preferably outwardly bowl-nosed shaped edge. A selectively removable and planar shaped top is arrayed upon the base in overhead fashion relative to the interior cavity and likewise is preferably shaped in a substantially rectangular manner. The top includes a plurality of outwardly facing perimeter edges which, upon positioning the top in overhead fashion above the mold interior cavity, are spaced in inwardly and opposing fashion relative to associated and opposing edges of the interconnected sides of the base and establish an outer perimeter channel therebetween. An initial surface coat of material is applied to the exposed central planar and side surfaces of the base and, subsequent to arraying of the top, a pour of resinous material is introduced to fill the interior cavity of the mold as well as a selected height of the outer perimeter channel. The countertop product created by the resin pour is permitted to set a predetermined time within the mold assembly until it has substantially cured and the mold assembly is constructed so that the countertop product may be demounted from within the mold prior to completed curing.

17 Claims, 12 Drawing Sheets

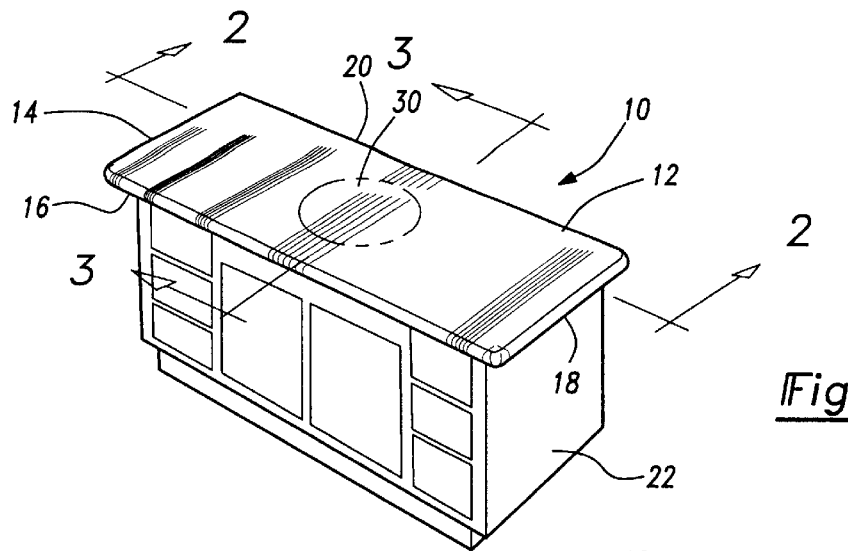
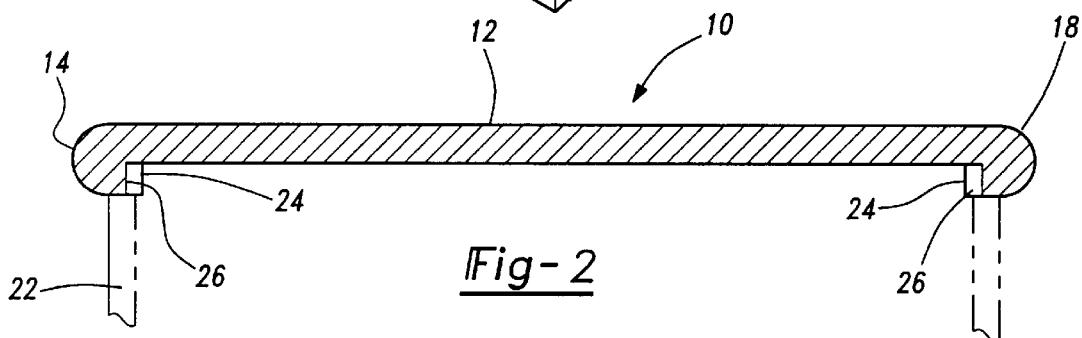
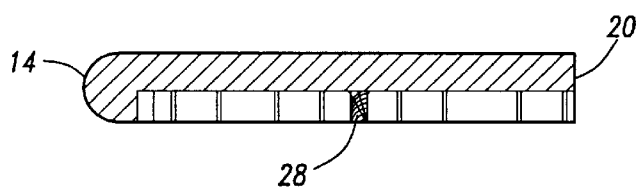
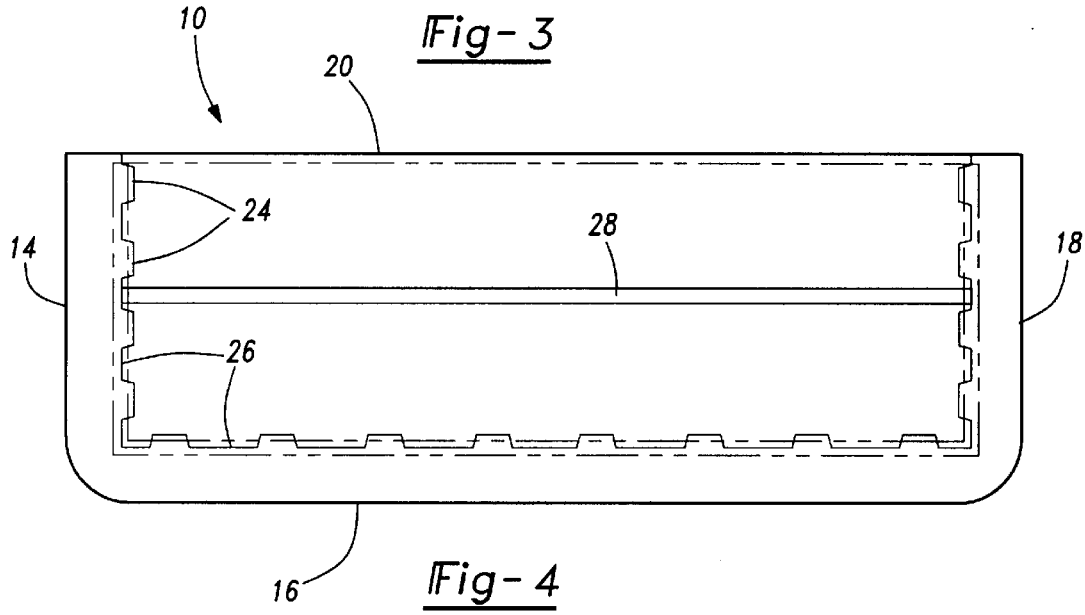

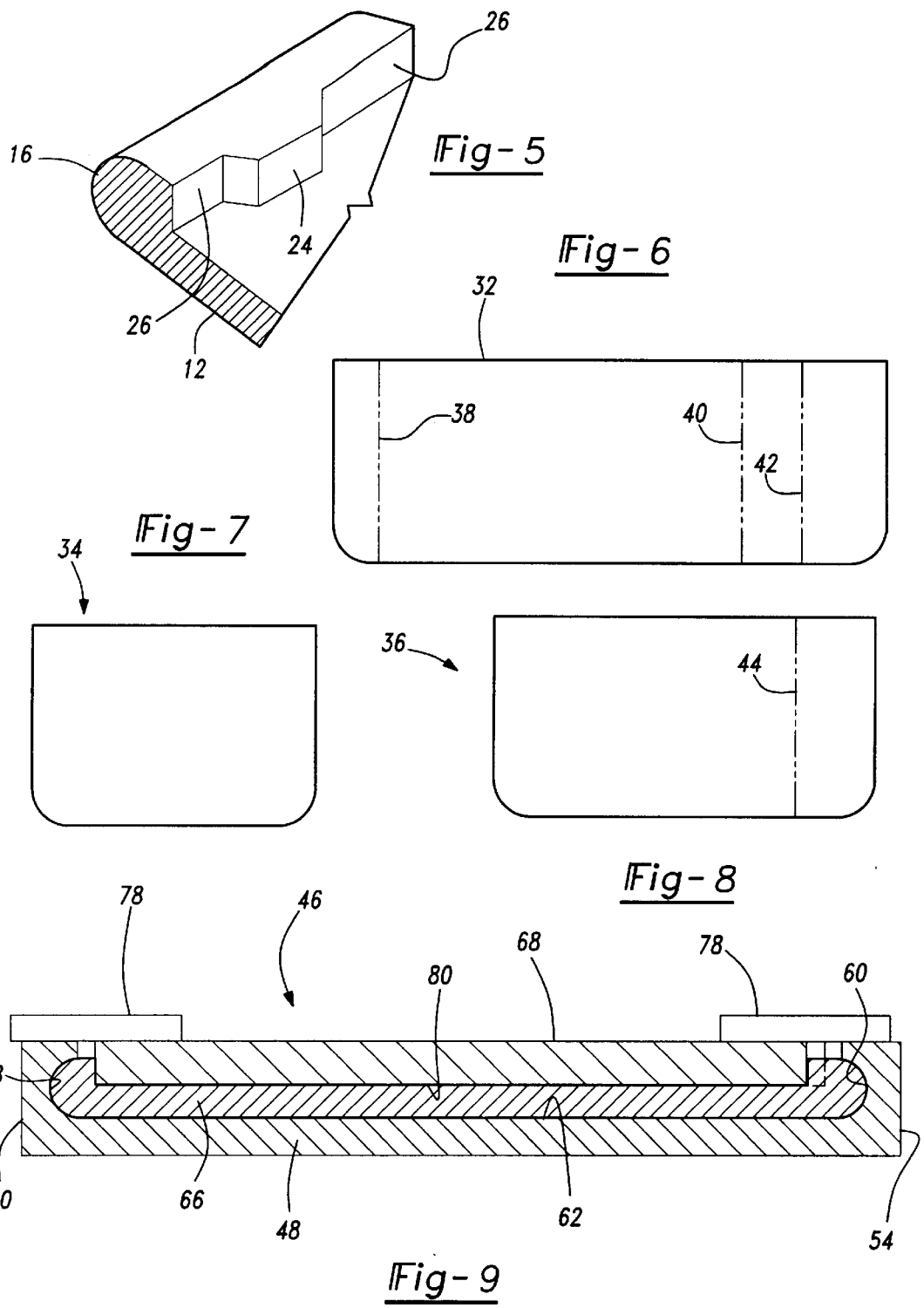

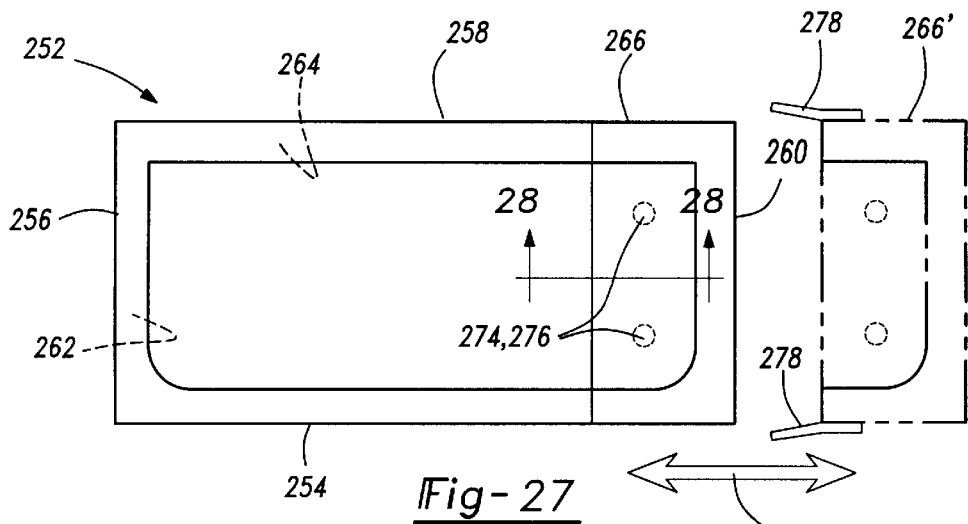
Fig-27
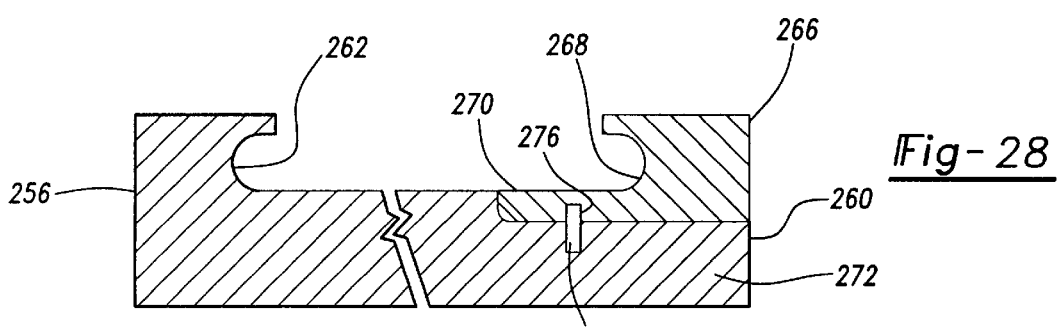
Fig-28
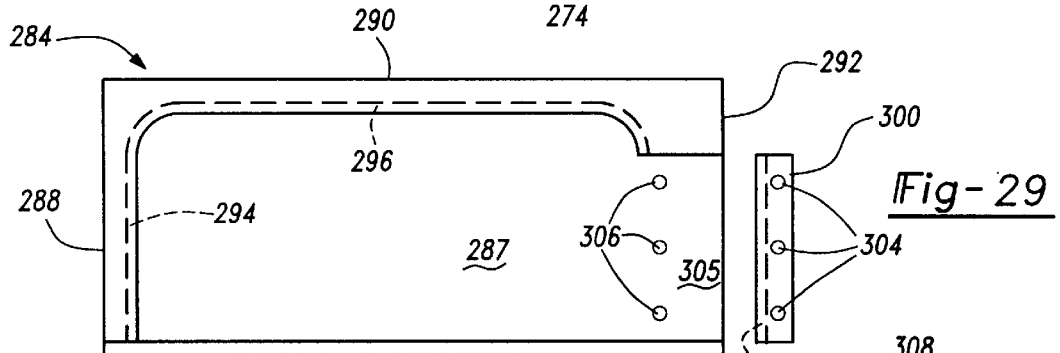
Fig-29
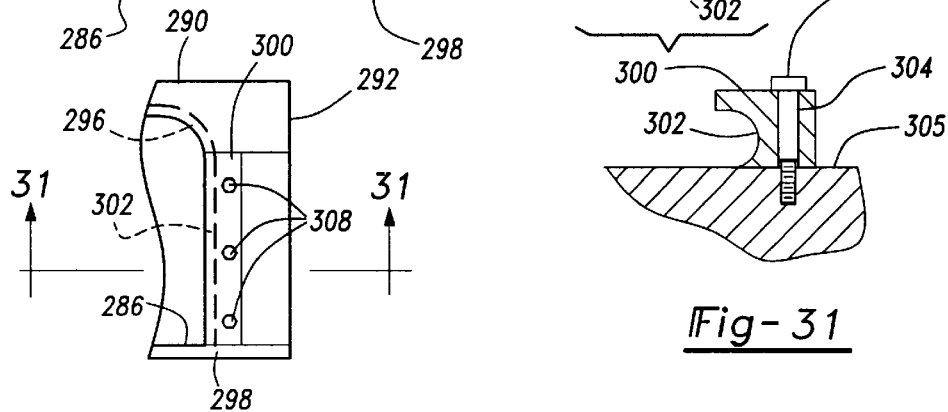
Fig-30
Fig-31

MOLD ASSEMBLY FOR CREATING A COUNTERTOP PRODUCT DISPLAYING A BUILT-UP EDGE AND METHOD FOR PRODUCING THE SAME

BACKGROUND OF THE INVENTION

1. Field of the Invention

The present invention relates generally to mold assemblies for creating countertop products and, more particularly, to an improved assembly for creating a countertop product displaying a built-up edge and a method for producing a countertop utilizing such an assembly.

2. Description of the Prior Art

Mold processes are known in the art for creating finished solid surface countertops. An example of such a process is illustrated in U.S. Pat. No. 5,628,949, issued to Bordener, which teaches a negatively shaped and open countertop mold which is constructed by a plurality of barriers placed in interconnecting fashion atop a flat polished surface. An initial spray of a continuous layer of a high quality resin coating is applied over the exposed top and elevated side surfaces of the mold and, after being permitted to cure for a selected period of time, is backfilled by a first pour of a substrate material over the gelled high quality resin coating. In order to create a desired built-up edge for the countertop additional barriers are constructed atop the substantially gelled first pour and in desired proximity to the edges of the mold enclosure defining barriers. A subsequent layer of substrate material is then poured to fill an outer perimeter channel established between the damming barriers and the enclosure defining barriers. The mold and countertop are then permitted to set and cure for several hours, following which the completely gelled and cured countertop is demounted from the mold by dissassembling the mold barriers.

The Bordener '949 reference teaches a very novel and useful process for producing a solid surface countertop which is an improvement over sheet stock surface products such as Dupont CORIAN or Surell FORMICA which of necessity must be manually cut and fabricated and then surface finished. The disclosure of the Bordener '949 reference is however such that it is fairly limited to the creation of a substantially horizontally oriented and gravity casted mold process construction. The construction of Bordener '949 further requires that a substantial period of cure time be employed prior to demounting the countertop from within the mold and so that the surface of the countertop is fairly completely dried and hardened so as not to be damaged during the demounting procedure.

Additional examples of closed mold assemblies for producing thin-walled plastic articles and the like, and which are unrelated to solid surface countertop technology, are illustrated in U.S. Pat. Nos. 5,064,585, issued to Cooper et al., 4,834,929, issued to Dehoff et al. And 4,208,368, issued to Egli. Cooper teaches a mold with two assembleable halves which meet at a parting plane and which are heated to an elevated temperature prior to receiving a fluidic curable resin at a pressure of at least 4 pounds per square inch. The molding is preferably a thin-walled and rigid plasticized kitchen sink which is produced in high volume.

Dehoff teaches close mold method for making precision and low cost molds, typically plastic panels, which involves the steps of orienting a pattern of a part to be produced on a surface plate and within a molding dam, applying release coating to the surfaces, applying a series thin resin layer, fiber reinforced resin and epoxy-dry plaster bonding layer, inserting a reinforcing framework into the dam and applying a bulk casting plaster to complete the body of the mold. Egli teaches a closable and sealable mold for producing molding articles of expandable plastic. A heated plastic melt material is directed into a mold core within the mold and which proceeds throughout the cavity to fill the area formerly occupied by the core. Venting means are provided for evacuating gas pockets created by the action of the heated plastic dissolving the foam construction core.

SUMMARY OF THE PRESENT INVENTION

The present invention is a mold assembly for creating a countertop product displaying a built-up edge according to a predetermined number of different sizes and which is further capable of being demounted from within the mold in reduced time as opposed to prior mold assemblies which require that the countertop completely set and cure within the mold prior to demounting. The mold assembly includes a substantially flat and planar shaped base bounded by a plurality of interconnected and upwardly extending sides which in combination define an interior cavity capable of receiving a pour of a resinous material. In the preferred embodiment, the base is substantially rectangular in shape in cross section having first, second third and fourth sides. Any selected number of the interconnected and upwardly extending sides are further configured so that they possess inwardly configured surfaces which result in the generated countertop product exhibiting a built-up edge.

A removable and planar shaped top is arrayed upon the planar shaped base in overhead fashion relative to the interior cavity and is likewise preferably rectangular in shape with outwardly facing perimeter edges which are spaced in inwardly and opposing fashion relative to the opposing interconnected and upwardly extending sides. Depending upon the preferred embodiment, the top may be bolted upon the base, suspended above the interior cavity by outwardly extending support members which set upon upper surfaces of the base or even hingedly secured along an edge of the base. The spaced apart arrangement of the outer perimeter edges of the top relative to the inwardly facing edges of the opposed upwardly extending sides creates in combination an outer perimeter channel. According to the preferred embodiment, a countertop is produced by first applying a relatively thin layer, 0.005" to 0.060", of a surface coating of a resin by a spray applicator onto the exposed base and side surfaces. A volume of a resinous flowable backing material, ranging from 0.38" to 0.75" base thickness and from 1.00" to 4.00" for built-up edging, is then introduced such as by pouring over the surface layer and is permitted to set and harden for a specified time period.

The mold assembly according to the invention is constructed so as to permit a substantially cured and hardened countertop which can be produced according to one of an established number of sizes to be demounted from within the mold in less time than is normally required in prior art mold assemblies in which it is necessary for the surface coat and undercoat of resin material to completely harden prior to removal and so as to prevent damage to the coatings of material which would otherwise occur with premature demounting. According to existing mold assemblies, the resin based countertop of necessity must remain in the mold longer, until it is substantially entirely hardened, and due to restrictions in the available amount of gripping surfaces and gripping area of the countertop which are available within the mold.

According to one preferred embodiment, the mold assembly facilitates demounting of the substantially cured countertop by providing the planar shaped base as a plurality of two or more subsections which can be separated after substantial hardening of the resin based countertop which is setting within and serves to provide additional gripping surfaces along the countertop to facilitate early demounting. Opposing and interengaging faces of the two or more separable subsections include locating means, such as aligning pins and slots, which facilitate quick assembly/ disassembly of the mold subsections. Additional preferred embodiments teach variants of the mold assembly in which portions of the mold associated with the mold defining sides are capable of being removed after substantial curing of a veneer solid surface countertop to facilitate demounting of such countertops.

In a yet further preferred embodiment, the mold assembly base is provided as a single piece, however oppositely extending and built-up edges of the base are outwardly contoured along a horizontal plane to a very slight extent so that, upon substantial gelling and curing so that the drying surface coat and substrate pulling away from the associated surfaces of the mold, the countertop may be axially and slidably withdrawn. In a still further preferred embodiment, a base of the mold assembly is provided as an integral and enclosed four sided structure in which the inwardly facing sides are substantially straight and tapered in a slight outward angle to facilitate vertical demounting of a veneered solid surface countertop product after substantial gelling.

In yet further embodiments, pluralities of individual air passages are formed into the base of any of the previously discussed mold assemblies at spaced apart locations around its outer periphery and are capable of being accessed by a pneumatically charged air nozzle to facilitate air release of the substantially hardened surface coating of the countertop and its associated adhering mold surfaces. As previously explained, it is understood that a pneumatic air release assembly can be utilized in combination with one or more other types of demounting configurations, the objective in each instance is the ability to demount the produced countertop in less time than that which has been possible up to now.

BRIEF DESCRIPTION OF THE DRAWINGS

Reference will now be made to the attached drawings, when read in combination with the following specification, wherein like reference numerals refer to like parts throughout the several views, and in which:

FIG. 1 is an environmental view in perspective which illustrates a countertop produced according to the mold assembly of the present invention installed upon a conventional cabinet;

FIG. 2 is a cutaway view taken along line 2—2 off FIG. 1 and illustrating a side profile of the countertop in a settable position atop the cabinet which is facilitated in part by the alternating pattern of alternating projecting and recessed portions extending around a perimeter of the countertop;

FIG. 3 is a cutaway view taken along line 3—3 of FIG. 1 and illustrating an end profile of the countertop with a forward contoured and built-up edge and a rearward vertical backing edge;

FIG. 4 is a top view of a mold assembly holding a resin based countertop in a setting position;

FIG. 5 is a fractional view of an edge of a countertop produced according to the mold assembly of the present invention and further showing a portion of the alternating pattern of projecting and recessed portions formed along an inner vertical surface of the built-up edging;

FIG. 6 is a top planar view of a countertop according to a selected length constructed according to the mold assembly of the present invention and which is capable of being sectioned at desired locations as indicated according to a desired installation;

FIG. 7 is a view similar to that shown in FIG. 6 and illustrating a further countertop according to a further selected length which is constructed according to the mold assembly of the present invention;

FIG. 8 is a further view similar to that shown in FIG. 6 and illustrating a yet further countertop according to a further selected length utilizing the mold assembly of the present invention and which is likewise capable of being sectioned according to a further desired installation;

FIG. 9 is a side view in cutaway and illustrating the mold assembly according to a preferred embodiment of the present invention with the removable top placed atop the planar shaped base in an overhead and suspended position relative to an interior cavity formed within the base;

FIG. 27 is a top view of the mold assembly illustrated in FIG. 26 and showing in phantom a removable portion of the mold according to the further preferred embodiment of the present invention;

FIG. 28 is a frontal cutaway view taken along line 28—28 in FIG. 27 and further illustrating the means for locating and securing the removable portion of the mold according to the further preferred embodiment of the present invention;

FIG. 29 a top view in partially exploded fashion of the mold assembly according to a further preferred embodiment of the present invention;

FIG. 30 is a top partial view of the mold assembly illustrated in FIG. 29 and showing a removable mold defining member in place within the mold according to the further preferred embodiment of the present invention;

FIG. 31 is a cutaway view taken along line 31—31 of FIG. 30 and showing one of the plurality of threaded bolts for fastening the removable mold defining member to the mold according to the further preferred embodiment of the present invention;

DESCRIPTION OF THE PREFERRED EMBODIMENTS

Figure 10:
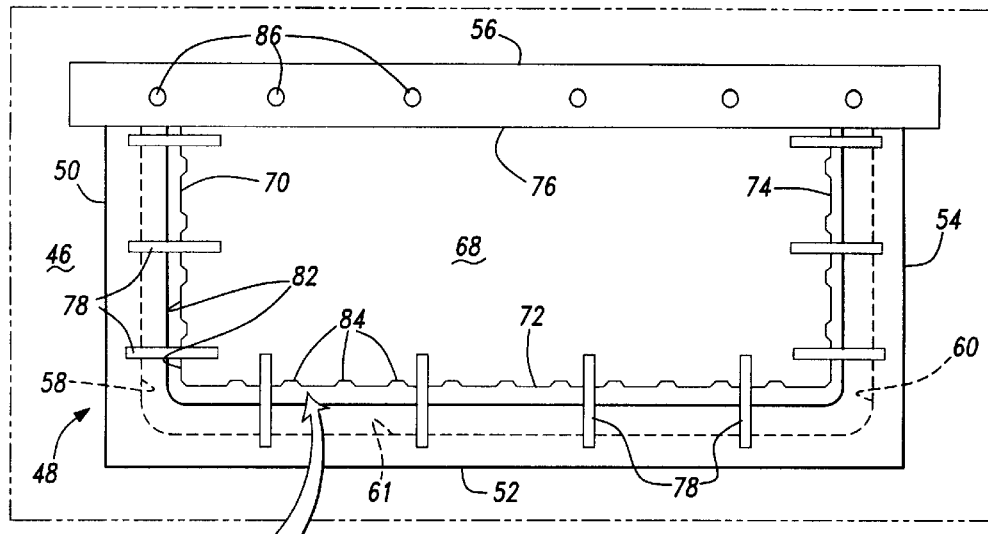
FIG. 10 is a top view of the mold assembly according to the preferred embodiment of FIG. 9 and further showing the manner in which the removable and planar shaped top is supported upon the base.

Referring now to FIG. 1, a countertop 10 is shown which is created utilizing the mold assembly according to the present invention. The countertop 10 is in the preferred embodiment constructed of the solid surface variety, exhibiting a relatively thin surface coating of a high quality resin and a backfill or substrate layer of a low grade plasticized resin. A further explanation of the construction of a countertop 10 such as is described herein will be further understood upon reference to U.S. Pat. No. 5,628,949, the disclosure of which is hereby incorporated by reference. Additional examples of known and available solid surface products include countertops constructed from materials known commercially as Avonite and Corian.

The countertop 10 produced according to the mold assembly is polygonal shape with any selected number of sides, however is preferably rectangular with a central planar area 12 bounded by a first edge 14, a second edge 16, a third edge 18 and a fourth edge 20. The edges 14, 16, and 18 of the countertop are built-up with a generally rounded and bull-nosed configuration and, as is best seen in FIG. 3, the fourth edge 20 is flat along its edge and may or may not be according to a reduced thickness consistent with the thickness of the central planar area 12.

The illustration of FIG. 1 shows the countertop 10 supported upon a cabinet 22 and, with reference to FIGS. 2, 4 and 5, an underside of the countertop 10 is further evidenced by a pattern of alternating projecting portions 24 and recessed portions 26 which in combination make up an underside and inner ledge of the countertop and which extend about the countertop periphery along a selected number of edges of the countertop, in this case built-up edges 14, 16 and 18. As is most clearly shown in FIG. 2, the alternating pattern of projections 24 and recesses 26 enables the countertop 10 to be supported upon the cabinet 22 such that the built-up edges will not slip over the supporting edges of the cabinet and facilitates attachment of the countertop to the cabinet utilizing adhesives or the like. The mold assembly according to the present invention which makes possible the construction of the countertop 10 will be described subsequently in more detail.

A reinforcing beam 28, such as a wooden batten, is provided to add reinforcing support to the countertop both during transport and installation and extends from a selected edge 14 to an opposite edge 18. The view of FIG. 1 further illustrates in phantom a circular pattern 30 which is representative of a cut which can be made into the countertop central planar area 12 for subsequent installation of a sink bowl.

Referring now to FIGS. 6, 7 and 8, additional examples of differently sized countertops are illustrated at 32, 34 and 36, respectively. An objective of the mold process of the present invention is the ability to create in reduced time a countertop according to one of a fairly standard number of commonly utilized dimensions, such a countertop further being easily sectioned, as necessary, to accommodate a wide variety of commercial and residential applications. Specifically, the countertop 32 illustrated in outline in FIG. 6 can be easily sectioned along lines 38, 40 and/or 42 as needed to accommodate a first number of selected applications. Likewise, the countertop 34 illustrated in FIG. 7 is produced at a selected size and the countertop 36 of FIG. 8 may be sectioned along line 44 as desired. As is also evident, any configured countertop 10, 32, 34 or 36 can possess any number of built-up and/or bull-nosed edges as desired and examples of this would include all four edges being bull-nosed for producing a countertop island, three of such edges being bowl-nosed for creating a stand alone countertop facing a wall along a fourth edge, two of such edges being bowl-nosed for creating a countertop end-piece and even only a single edge being bowl-nosed for producing a length of countertop forming an intermediate piece of a straight and elongate running length Having described in fair detail the components of the countertop, reference is now had to FIGS. 9, 10 and 11 which illustrate an improved mold assembly 46 for producing such a countertop according to a first preferred embodiment of the present invention. The mold assembly 46 includes a substantially flat and planar shaped base 48 which is bounded by a plurality of interconnected and upwardly extending sides to form a generally polygonal shape. Consistent with the disclosure of the countertop produced in FIGS. 1–8, the planar shaped base 48 is preferably rectangular in shape with a first upwardly extending side 50, a second upwardly extending side 52, a third upwardly extending side 54 and a fourth side 56.

As is best shown in the side view of FIG. 9, the sides of the countertop define inwardly facing edges, illustrated by edge 58 for first side 50 and edge 60 for third side 54. These edges 58 and 60 are further illustrated in interior phantom line in the top view of FIG. 10 and, along with an interconnecting edge 61 extending along side 52, form a three-sided bowl-nosed configuration. The inwardly facing edges, in combination with an upwardly facing surface 62 of the base 48, define an interior cavity of the base for receiving first a spray coat of high quality resin surface material and secondly a back pour of a substrate material for creating an appropriate countertop article, as is illustrated schematically at 64 in FIG. 10 and by the in-mold countertop 66 in FIG. 9. Consistent with the disclosure previously given, the inwardly facing edges of the sides of the mold base may be contoured in a bowl-nosed fashion as illustrated by sides 58 and 60 or may be straight edged, such as is the case with fourth side 56 and as will be better described with reference to FIG. 11.

Referring again to FIGS. 9 and 10, a removable top is provided which is constructed of a planar shaped body 68 having a desired thickness and with first, second, third and fourth outwardly facing perimeter edges 70, 72, 74 and 76 which correspond to the sides 50, 52, 54 and 56 of the base. The top is constructed of either an integrally solid or hollow member and is arrayed over the base, in the instant preferred embodiment by a plurality of outwardly extending suspension support members 78 which extend from the first, second and third outwardly facing perimeter edges 72, 74 and 76 of the top 68 and so that an underside of the top, illustrated at 80 in FIG. 9, is suspended within the interior cavity and defines a closed upper surface of the cavity.

Comparing the mold assembly top view of FIG. 9 with the associated countertop view in FIG. 4, it is evident how alternating projections 82 and recesses 84 extending along the outwardly facing perimeter edges 70, 72 and 74 of the top provide the impressions for the identical pattern formed along the inner extending and underside lip of the countertop which defines the interior ledge of the expanded thickness bowl-nosed edges. The outwardly facing perimeter edges of the top 68 are further arranged in inwardly spaced and opposing fashion relative to the inwardly facing edges of the upwardly extending sides of the base so as to establish a channel therebetween which is filled by the pour of resinous substrate material. A plurality of individual air passageways 86 are formed along the fourth side 76 of the base as shown in FIG. 10 and the significance of such air passageways will be further described with reference to the preferred variant of FIGS. 19–22.

Figure 11:
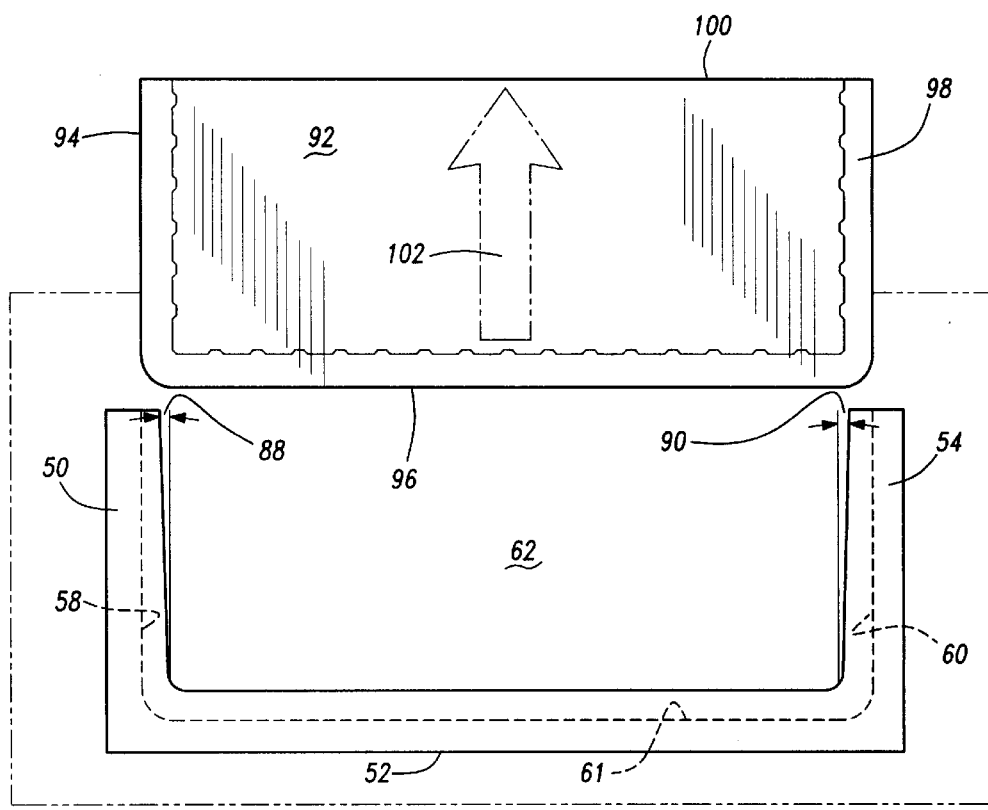
FIG. 11 is an operative view illustrating demounting of a substantially cured countertop from within the mold assembly according to a further preferred embodiment of the present invention.

In a preferred operative variant, the central and upwardly extending side surfaces of the mold base are first prepared and the initial spray coat of material is then applied to the exposed edges, following which the removable top is arrayed over the base and the subsequent pour of resinous material is applied for providing both the thickness and built-up edging to the countertop. A preferred manner of applying the substrate backing of resinous material is accomplished by pouring the material from a can or other holding container (not shown) directly into the surrounding channel between the outwardly facing edges of the top and the associated inwardly facing edges of the base so that the pour completely fills the central area of the interior cavity and to a desired level of the surrounding perimeter associated with the formation of the built-up edge. The application of the veneer solid surface resin can be accomplished in either a one-pour or two-pour application, this often depending upon the configuration and construction of the top, however the application of such a top 68 permits the depth of the countertop product to be achieved with a single backpour of resin. The countertop is permitted to sit and to gel for a specified time within the mold prior to removal of the top 68 and, after permitting the countertop to sit for a further period of time associated with substantially complete gelling and hardening, is ready for demounting from within the mold. Referring to FIG. 11 and, according to a preferred embodiment of the present invention, the fourth side 56 of the mold base 48 consists of a gate or abutment member which may be removed from the mold base so that the central planar area 62 communicates directly with the outer edge of the mold base. The fourth side 56 may either be hingedly attached to the mold base is provided as a gate or may simply be a planar elongate member with a desired length and width which is lifted away from sealing engagement with the fourth side after a desired period of gelling of the countertop being produced.

Referring again to FIG. 11, the opposing sides 50 and 54 of the base are further provided so that they each angle outwardly along a horizontal plane and at a very slight and incremental manner illustrated by intersecting pairs of planar lines 88 and 90. Accordingly, the very slight outward angle of the opposing sides 50 and 54 results in the associated curing edges of the countertop pulling away slightly from sides as they shrink and harden and which is also the result of natural phenomenom so that in effect only the upwardly facing central area 62 and perhaps the inner edge 61 associated with side 52 remain in contact with the cured countertop.

The countertop produced according to the mold assembly 46 is illustrated in FIG. 11 at 92 with first, second and third bowl-nosed edges 94, 96 and 98 and a flat interconnecting fourth edge 100. The countertop 92 is identical in configuration with the countertop 10 illustrated in FIG. 4 and is removed from within the mold by being axially slided in the direction of arrow 102. Referring again to FIG. 10, the air passageways 86 in the fourth side (gate or removable support) 56 of the base may also be utilized for providing additional release between the curing surfaces of the countertop and the abutting surfaces of the mold assembly 46, primarily the upwardly facing central area 62, and a description of this procedure again will be had with reference to the preferred embodiment in the disclosure of FIGS. 19–22.

Figure 12:
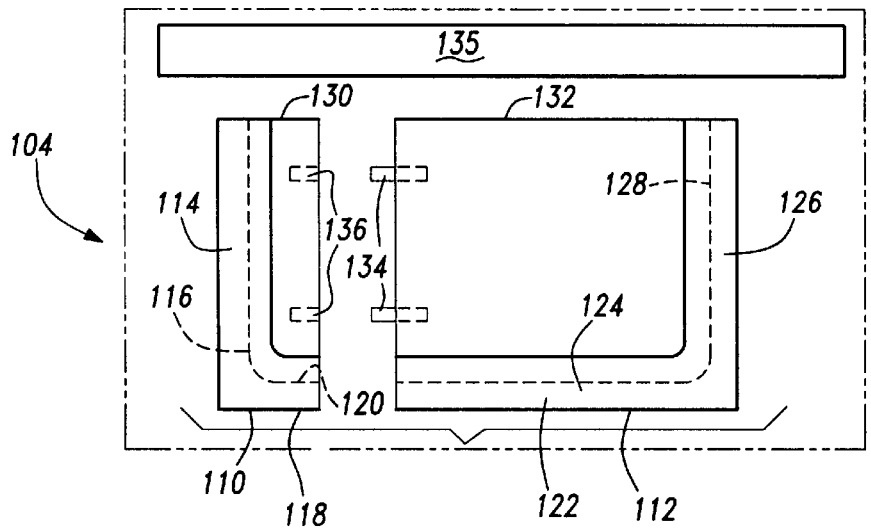
FIG. 12 is an exploded view of the mold assembly base provided in first and second subsections having pin and recess locating and interengaging means according to a further preferred embodiment of the present invention.
Figure 13:
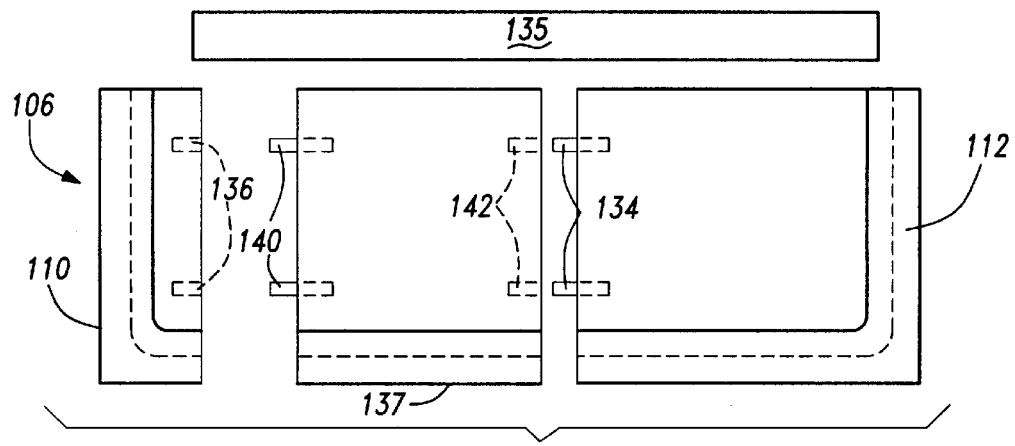
FIG. 13 is an exploded view similar to that illustrated in FIG. 12 and further showing a third subsection of the base which is capable of being interengaged between the first and second subsections to establish a mold assembly of a further specified length according to the present invention.
Figure 14:
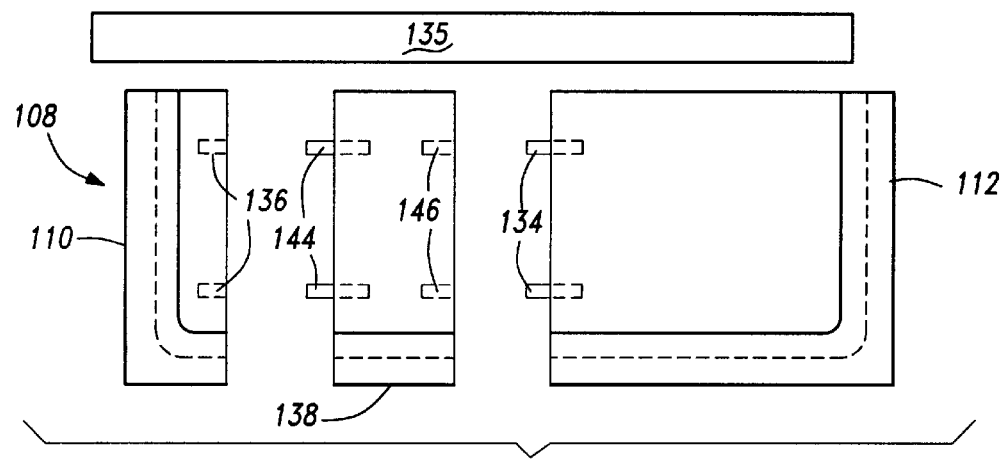
FIG. 14 is an exploded view similar to that illustrated in FIG. 13 and further showing another third subsection of the base according to a still yet further dimension to establish a mold assembly according to a further specified length.

Referring to FIGS. 12, 13, 14, variations 104, 106 and 108 of the mold assembly according to a further preferred embodiment are shown. In each instance, the mold base is provided in a plurality of individual sections which are assembleable together to establish a mold of a selected axial length. Referring to FIG. 12, the mold assembly 104 includes a first subsection 110 and a second subsection 112. The first subsection 110 includes a first side 114 with an inwardly facing bowl-nosed edge 116 illustrated in phantom and part of a second side 118 with a likewise inwardly facing bowl-nosed edge 120. The second subsection 112 includes a remaining running length of a second side 122 with inwardly facing edge 124 and a third side 126 with inwardly facing edge 128. Both the first and second subsections 110 and 112 include a flat central area which is bounded by the upwardly extending sides and which also extends in communicating fashion along fourth edges, illustrated at 130 and 132 respectively.

The first and second subsections 110 and 112 are assembleable together by location and interengaging means, such means in the preferred embodiment being pins 134 which extend from an abutting edge of a first associated subsections (second subsection 112) and corresponding recesses 136 which are formed within an abutting edge of a second associated subsection (first subsection 110). Other types of location and interengaging means may alternatively be employed and could include adhesives or other conventional means. It is however desirable that the location and interengaging means provide for quick and efficient assembly and disassembly of the mold base subsections to assemble together a desired length.

The first and second subsections 110 and 112 are assembled together so as to define a selected overall length to the mold assembly and an additional elongate member 134 is provided which is abuttingly sealed against the fourth open side of the assembled base in order to provide a created countertop article with a fourth straight edge to complement first, second and third bowl-nosed edges. Referring further to FIGS. 13 and 14, the different variations 106 and 108 of the subsection mold assemblies are constructed in identical fashion in comparison to the disclosure of FIG. 12, the exception in each case is that a third subsection (illustrated at 136 in FIG. 13 and at 138 in FIG. 14) is provided for assembly between the first subsection 110 and second subsection 112 to provide a lengthened mold assembly according to a desired application. In each case, the third subsection 136 and 138 is provided with additional pin and recess location means, illustrated at 140 and 142 for third subsection 136 and at 144 and 146 for third subsection 138 for incorporating between the associated pin 134 and recess 136 arrangements of the first and second subsections.

Figure 12A:
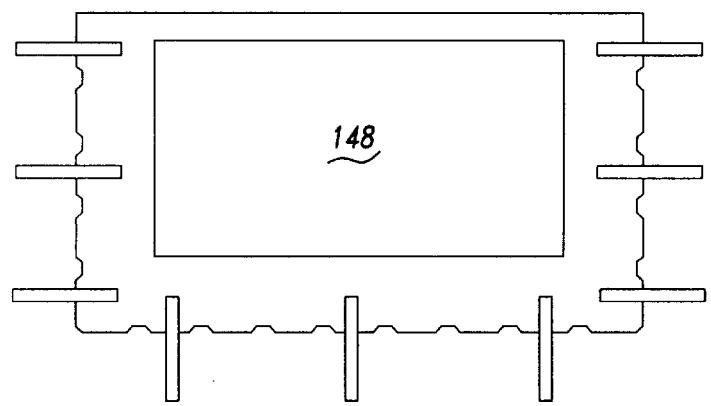
FIG. 12a is a view of a removable and planar shaped lid for use with the assembleable base illustrated in FIG. 12 according to the present invention.
Figure 13A:
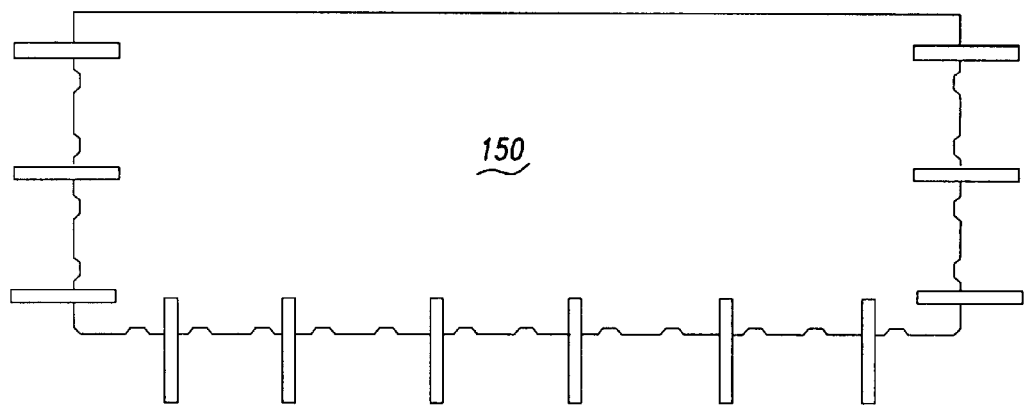
FIG. 13a is a view of a further removable and planar shaped lid for use with the assembleable base illustrated in FIG. 13 according to the present invention.
Figure 14A:
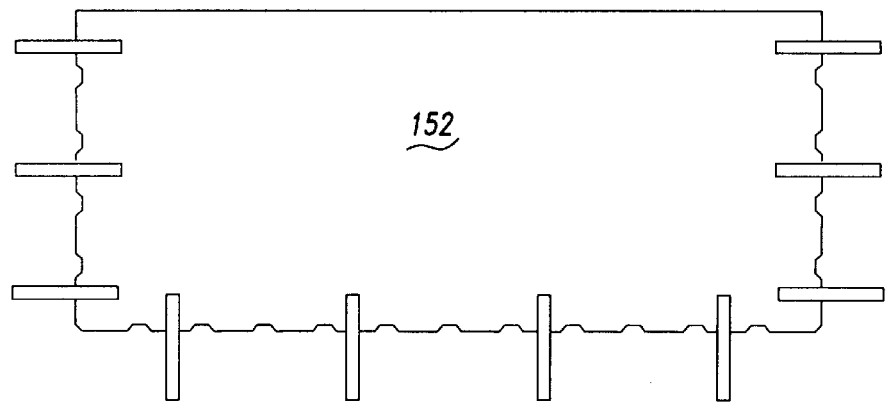
FIG. 14a is a view of a further removable and planar shaped lid for use with the assembleable base illustrated in FIG. 14 according to the present invention.

Referring to FIGS. 12a, 13a and 14a, a first removable top 148, a second removable top 150 and a third removable top 152 are provided which are constructed substantially identical to the top 68 described in FIG. 10 and which are capable of being arrayed atop an assembled mold assembly base such as illustrated in FIGS. 12, 13 and 14, respectively. With specific to FIG. 12a, top 148 may be provided by a four-sided divider with an open interior, the divider functioning the equivalent of a planar shaped top, such as their either solid or hollow tops previously disclosed. According to a preferred embodiment of the invention, the ability to provide the mold assembly base as a plurality of individual and assembleable subsections makes possible the creation of countertop articles according to standard variations of size such as are shown at 32, 34 and 36 in FIGS. 6, 7 and 8, such countertop articles again capable of being sectioned as necessary according to a variety of installation requirements.

Figure 15:
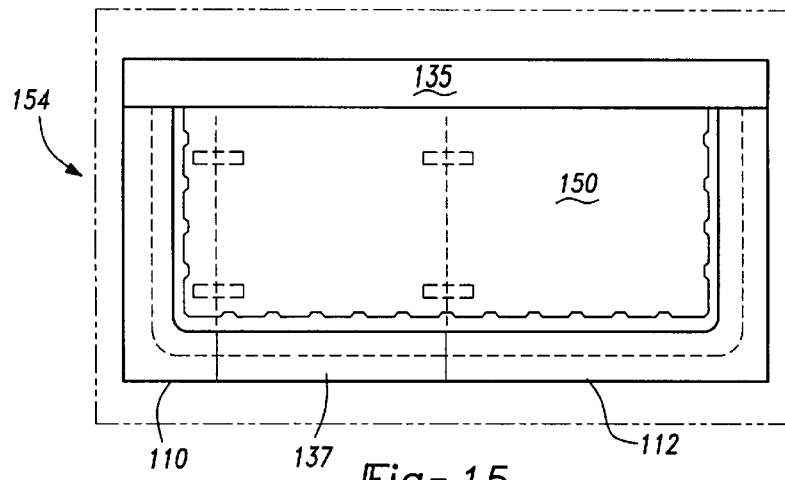
FIG. 15 is an assembled view of the mold assembly illustrated in FIGS. 13 and 13a for creating a resin based countertop.

Referring now to FIG. 15, an assembled mold 154 is illustrated of subsectioned mold base 106 also illustrated in exploded view in FIG. 13 and an arrayed and removable top 150 placed atop the base and which is also shown in FIG. 13a. Once assembled together, creation of the countertop article may commence by first applying the spray coating of material over the exposed surfaces and according to the desired thickness and then complementing with the introduction of the backpour of resin material to provide the thickness to the planar central area and built-up edges and in support of this the disclosure of the procedure discussed in FIG. 10 is repeated herein.

Figure 16:
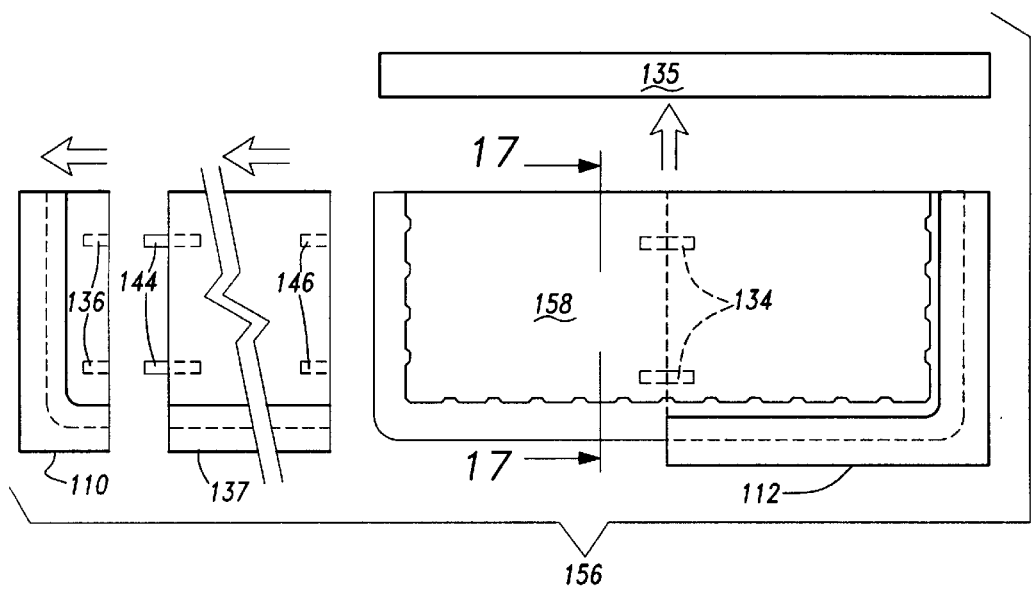
FIG. 16 is a view of the mold base which illustrates the removal of two of the mold subsections, exposing a portion of the substantially cured countertop for demounting from the remainder of the mold.
Figure 17:
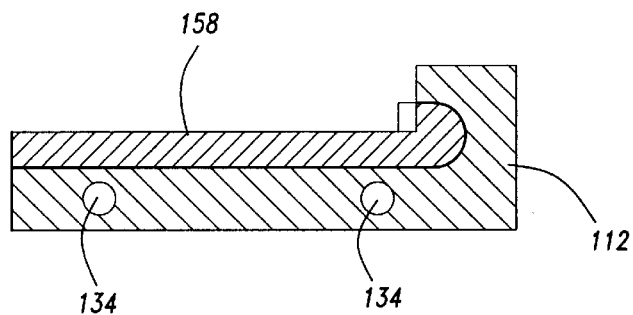
FIG. 17 is a cutaway view taken along line 16—16 of FIG. 16 and illustrating the countertop and remaining base subsection in a side profile.

Referring to FIG. 16, an exploded view 156 is shown of the demounting procedure for removing a substantially cured countertop 158 from the mold assembly. As was previously explained, an objective of the present invention is the ability to demount a substantially gelled and cured countertop article from a mold enclosure assembly in less time and with reduced effort than that which has been heretofore made possible by prior art mold assemblies. In the instant embodiment, this objective is met by disengaging the subsections 110 and 136 from the subsection 112 by unseating the pins from their associated recesses and so that a significant portion of the countertop 158 is exposed beyond the interengaging edge of the mold base subsection 112. FIG. 17 also illustrates in cutaway the arrangement of the substantially cured countertop article 112 setting upon the remaining mold subsection 112.

Figure 18:
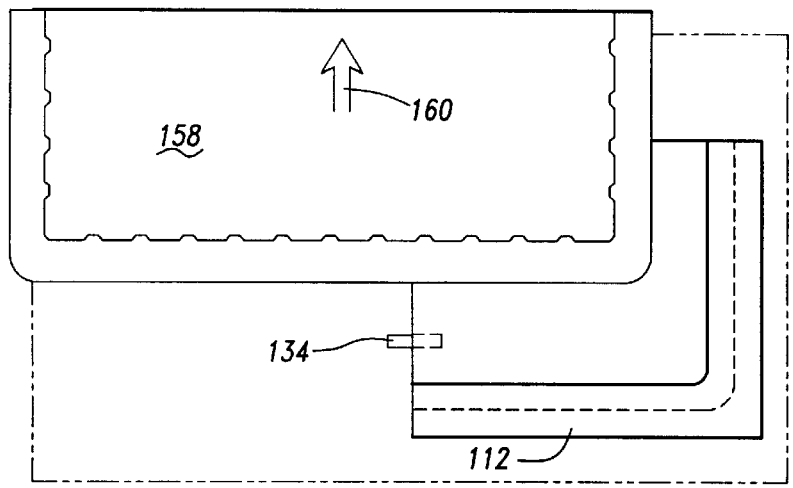
FIG. 18 is a view similar to that shown in FIG. 16 and illustrating the removal of a substantially cured countertop from a subsection of the mold assembly according to the present invention.

Referring to FIG. 18, the removal of the mold base subsections 110 and 136 reveal additional gripping surfaces along the substantially cured countertop article 158 which enable the user to grasp the countertop 158 along additional exposed surfaces and edges and to remove the countertop from the remaining mold subsection 112 in the direction indicated by arrow 160. As was previously stated, the ability to expose a greater area of the curing countertop article from the confines of the mold allows for earlier demounting than has been heretofore possible with conventional molds which require complete curing and full shrinkage of the article prior to demounting so that the surface of the article is not damaged during removal from the mold.

Figure 19:
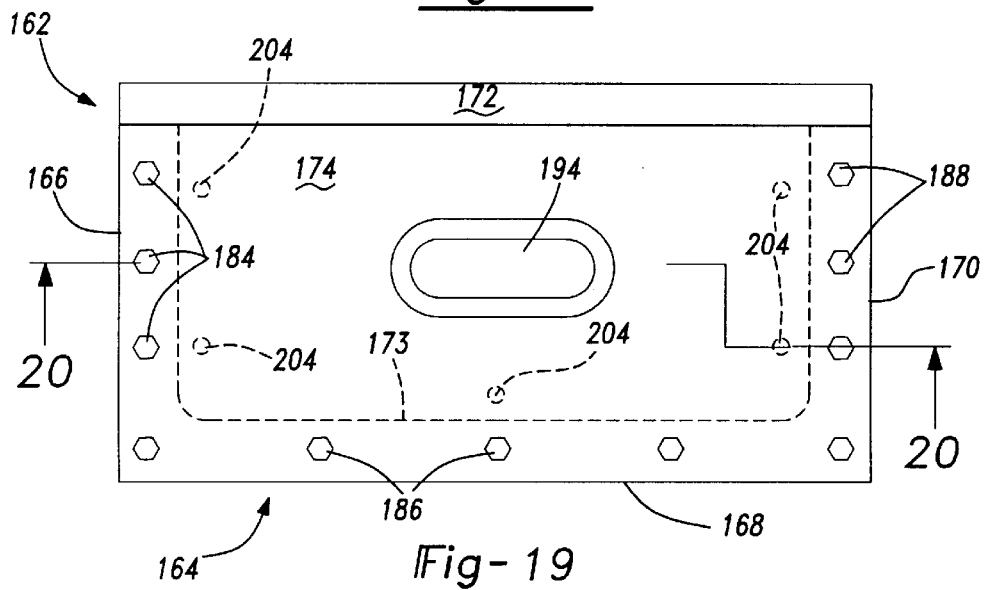
FIG. 19 is a top view of a mold assembly according to a further preferred embodiment of the present invention.
Figure 20:
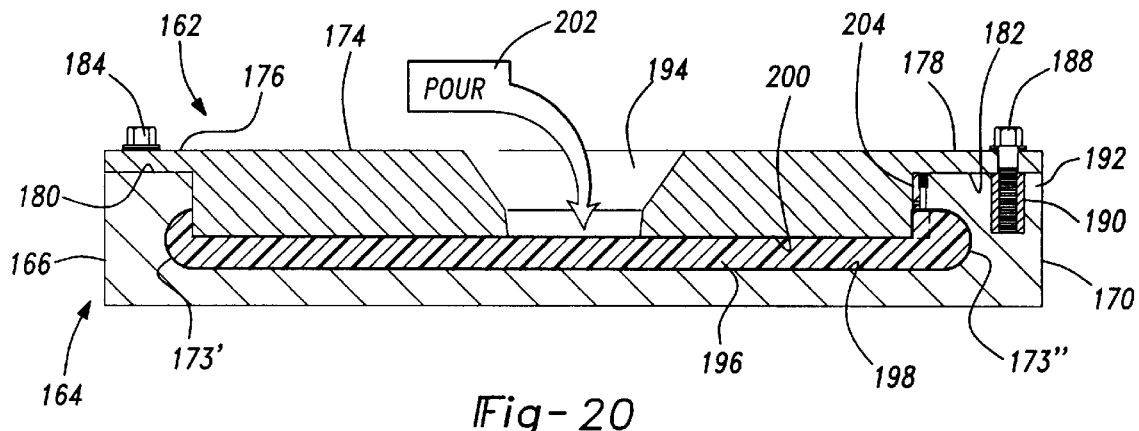
FIG. 20 is a cutaway view taken along line 20—20 of FIG. 19 and illustrating a one pour system for creating a resin based countertop according to the mold assembly of the present invention.

Referring now to FIGS. 19 and 20, a further preferred embodiment 162 of the mold assembly according to the present invention is shown and includes a base 164 which again is preferably rectangular in shape with a first upwardly extending side 166, a second upwardly extending and interconnected side 168, a third upwardly extending and interconnected side 170 and a fourth side 172. The first, second and third sides 166, 168 and 170 again may form inwardly contoured edges which, in combination, result in the creation of a bowl-nosed edge to the countertop and this edging is shown in phantom at 173 in FIG. 19 and again at 173' and 173" in the cutaway view of FIG. 20. Likewise, the fourth side 172 can be an elongate member 172 with a flat inner edge which will result in the creation of a countertop article in which three edges are built-up with bowl-nose configuration and the fourth edge is straight for mounting against a wall surface.

A removable and substantially planar shaped top 174 is capable of being arrayed over the mold base 164 and this is provided in the instant preferred embodiment by reduced dimension and outer extending lip portions (illustrated at 176 and 178 in FIG. 20) of the top 174 which set upon associated and upwardly facing edges (again illustrated at 180 and 182 for base sides 166 and 170 in FIG. 20) of the base. The top 174 is fixedly secured to the base 164 by pluralities of mounting bolts which are illustrated at 184 along the first side 166 of the base, 186 along the second side and at 188 along the third side 170 of the base. Both the top 174 and base 164 have aligning apertures formed at equidistantly spaced intervals along their outer peripheries for receiving the pluralities of mounting bolts 184, 186 and 188 and, referring to FIG. 20, an internally threaded collar portion 190 is shown in cutaway which is placed within an associated recess of the base along third side 170 and which is capable of receiving an associatingly threaded shaft portion 192 of a selected bolt 188 for anchoring the top to the base.

A central and substantially funnel shaped aperture 194, or a series of such shapes, strategically located, is formed in a generally centralized location of the top 174 and communicates an exterior of the mold assembly with an interior cavity which corresponds to the dimensions of the poured countertop article illustrated in cutaway at 196 (FIG. 20) and which is defined by a central an upwardly facing surface 198 of the base 164 in combination with an opposing and downwardly facing surface 200 of the top 174 in combination with the four edges (see again bowl-nosed edges 173' and 173"). A resin pour process is again illustrated at 202 in FIG. 20 and, according to this preferred embodiment, allows the introduction of a single pour of a resin substrate material within the enclosed mold cavity for creating a countertop article exhibiting a built-up edge.

As previously discussed, the exposed planar and elevated side surfaces of the mold base 164 are preferably applied with the high-quality surface coating prior to installation of the top 174. After a predetermined period of cure time following the single back pour, which corresponds to substantial gelling and hardening of the built-up edges of the countertop article, the top 174 is unbolted and removed from the mold base 164 in preparation for demounting of the countertop article.

Figures 21, 22:
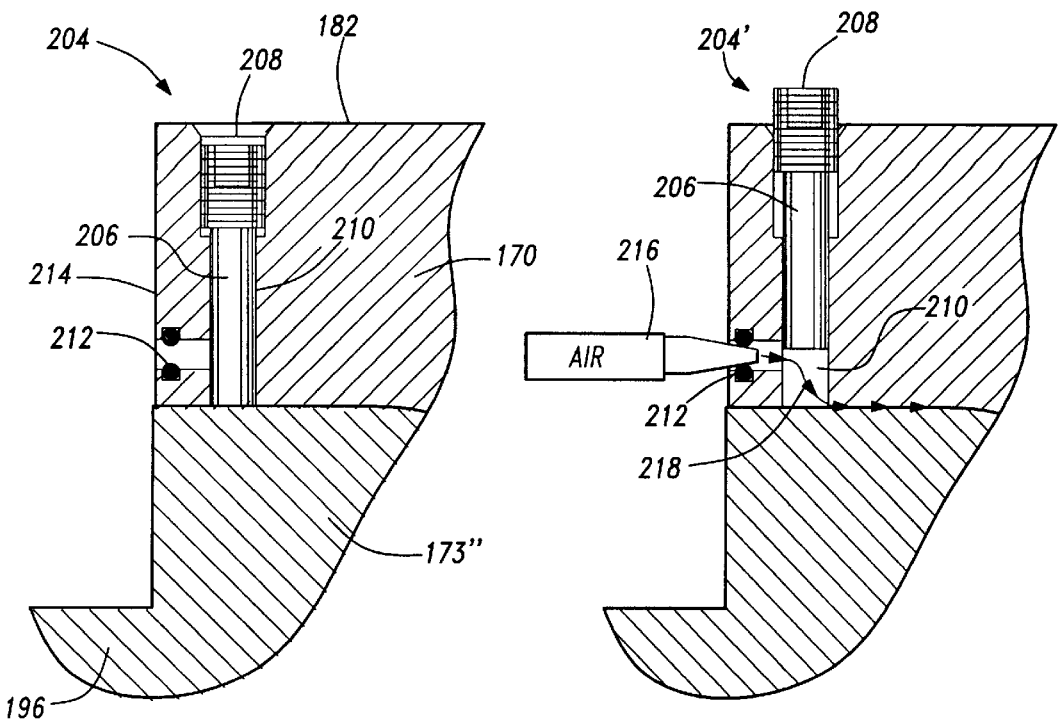
FIG. 21 is an enlarged view of a selected air passageway formed within the mold assembly in a first sealed position according to the present invention.
FIG. 22 is a view similar to that shown in FIG. 21 and illustrating the pin member retracted to a second communicating position so as to permit a nozzle to introduce a flow of pressurized air into the mold assembly according to the present invention.

Referring now to FIG. 21, in combination with FIGS. 19 and 20, a plurality of individual pneumatic release assemblies 204 are illustrated which are spaced apart at desired intervals along a specified number of sides, in this case sides 166, 168 and 170 of the mold base. Referring to FIG. 21, an enlarged view is shown of a specified release assembly 204 in a first sealed position along the third side 170 of the mold base 164. The assembly 204 includes a sealing pin member 206 with a shaft portion and a threadably engageable head portion 208 which is arrayed within a vertically extending channel 210 extending from the upper surface 182 of the exposed base side 170 to a point contacting a portion of the substantially cured countertop article 196, in this instance a location along the built-up edge portion 173". An additional horizontal channel 212 is formed in an inner vertical face 214 of the mold side 170 and communicates with a lower portion of the pin 206 seated within the vertical channel 210 and leading to the countertop 196.

Referring to FIG. 21, the pneumatic release assembly is illustrated in a second position 204' in which the pin member 206 is in an unsealed position. A screwdriver or the like (not shown) is applied to the threadably engageable head portion 208 to unseat the pin 206 upwardly to a sufficient extent so that the horizontal channel 212 is revealed in direct communication with the associated lower portion of the vertically extending channel 210. At this point, an air gun 216 with a nozzle tip portion is inserted within the horizontally extending channel 212 and a supply of pressurized air (not shown) is fed into the communicating channels 212 and 210 as shown by directional flow arrows at 218. The function of the pneumatic release assemblies is to supply pressurized successively at the individual and spaced apart locations 204 shown in FIG. 19 and the pressurized air functions to break contact between the curing surface coating of resin material from the associated edges and planar surface areas of the mold base. As was previously explained, a natural occurring phenomenom of such a drying countertop article is that the surface edges will tend to want to pull away from the associated edges of the mold during curing and the pressurized air functions to speed up this process.

In this fashion, the substantially cured countertop article 196 may be demounted from mold base 164 in less time than would otherwise be required if the article 196 were to completely set and cure on its own. Consistent with the disclosure of the other preferred embodiments, the article 196 may be conveniently demounted by removing the fourth side 172 (which can also be provided as a hingedly connected and vertically faced gate) and then sliding the article 196 axially and outwardly from the mold along the fourth side. Referring once again to FIG. 10, the air passageways 86 illustrated along the fourth side 76 of the mold assembly 46 may likewise function to provide pressurized pneumatic flow to the adhering surfaces between the countertop article and the mold base. The pneumatic release assemblies are envisioned so as to be capable of being utilized along with one or more types of mold assembly base constructions of the demounting assembly, such as the outwardly and incrementally configured mold sides shown in FIG. 11 or the mold base subsection assemblies illustrated in FIGS. 12, 13 and 14.

Figure 23:
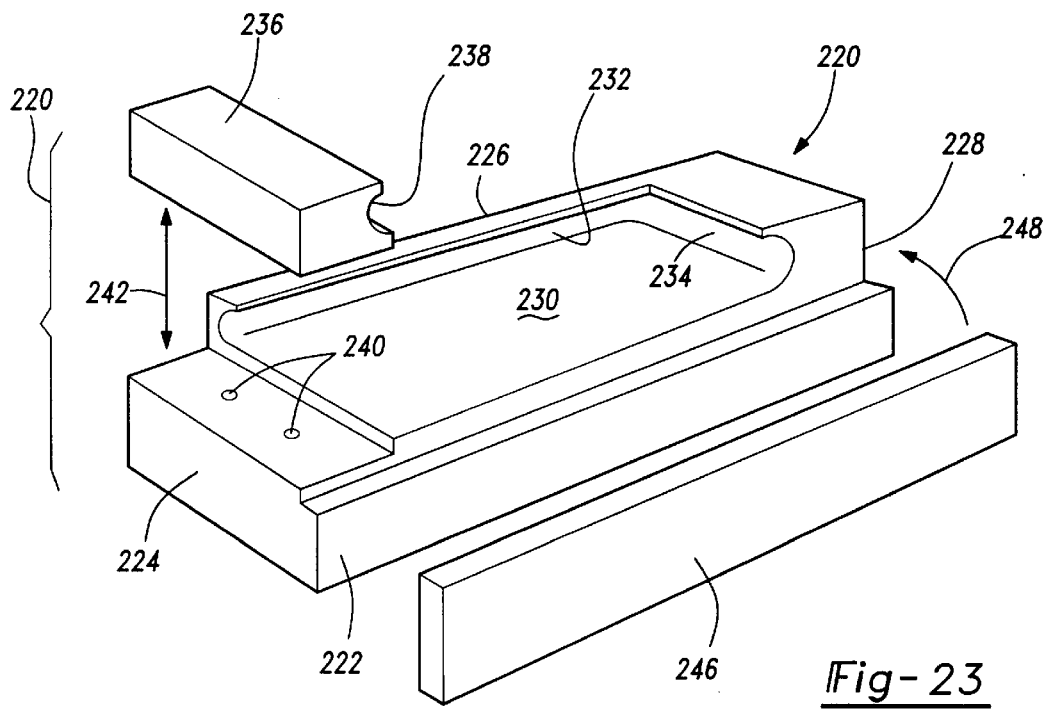
FIG. 23 is an exploded view in perspective of a mold assembly according to a further preferred embodiment of the present invention.
Figure 24:
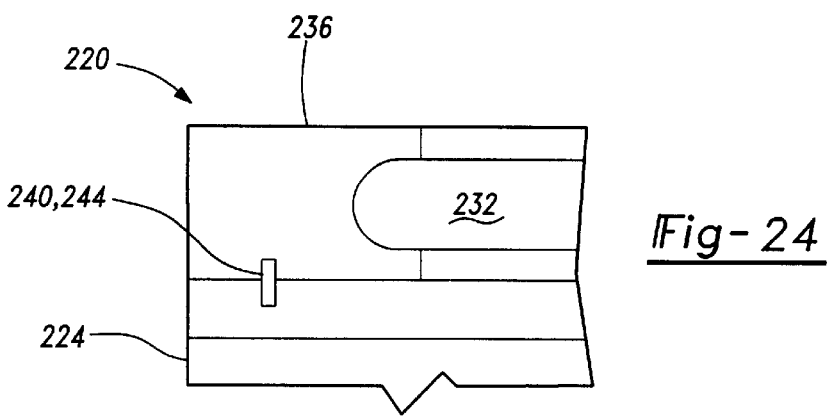
FIG. 24 is a frontal view in cutaway of the mold assembly according to FIG. 23 and illustrating a removable mold defining member.
Figure 25:
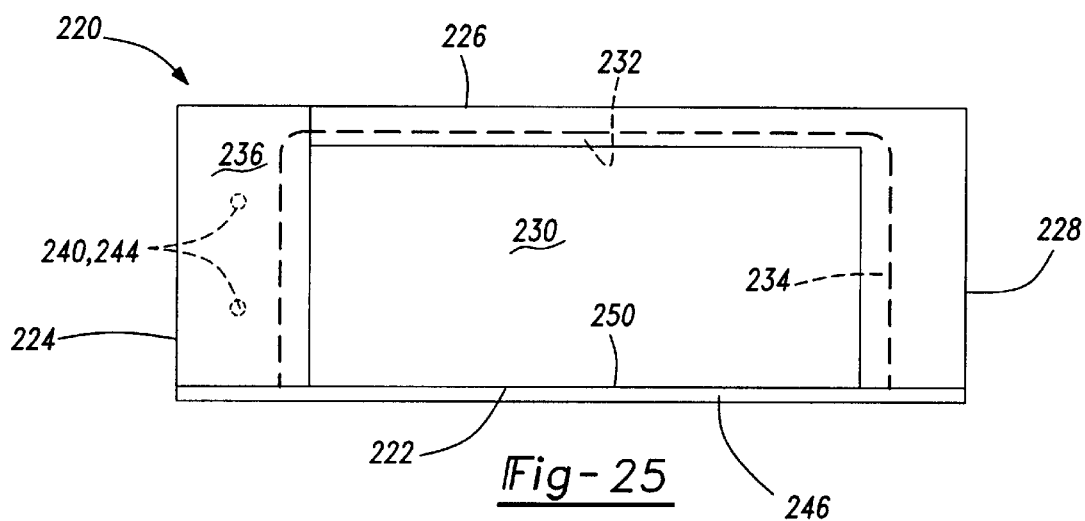
FIG. 25 is a top view of the mold assembly according to the further preferred embodiment illustrated in FIG. 23.

Referring now to FIGS. 23–25, an exploded view is illustrated at 220 of a base construction of a mold assembly for creating a veneered solid surface countertop product according to the present invention. The assembly 220, as well as further such assemblies which will be subsequently discussed with reference to FIGS. 26–28, FIG. 29–32 and FIGS. 33–36, may be utilized along with an appropriately securing and overhead top and/or with pneumatically release assemblies such as have been previously. However, only the base constructions of the following further preferred embodiments are illustrated for purposes of ease of presentation and explanation.

Referring again specifically to FIG. 23, the mold assembly 220 is presented as a rectangular shaped base having a selected depth and exhibiting a first side 222, a second side 224, a third side 226 and a fourth side 228. The assembly 220 establishes a platform within which is configured the negative cavity for the subsequently produced veneer solid surface countertop product to be produced. The cavity is illustrated by the planar shaped surface 230 which is bounded in part by a bull-nosed side 232 associated with third side 226 and a further interconnected bull-nosed side 234 associated with fourth side 228. An elongate and removable mold defining member 236 corresponds with the second side 224 of the mold base and includes a likewise bull-nosed configuration 238 along an inwardly facing surface thereof which, upon securing of the removable member 236 to the mold base, establishes the upwardly projecting second side 224. A pair of upwardly projecting tabs 240 on a flat upper surface associated with the second side 224 provide location for the removable member 236 and this member 236 is installed in a direction indicated by arrow 242 such that appropriately formed recesses 244 in the underside of the member 236 (see FIGS. 24 and 25) align and engage with the tabs 240. An elongate and substantially planar shaped gate 246 is provided and is attachable to the first side 224 of the base as referenced by directional arrow 248 in either an adhesive or pivotally securable fashion to enclose the mold defining surface. An inwardly facing mold defining surface 250 of the gate member (see overhead view off FIG. 25) is substantially planar and corresponds to a flat edge of the veneer solid surface countertop product to be produced for placement against a wall during installation.

Figure 26:
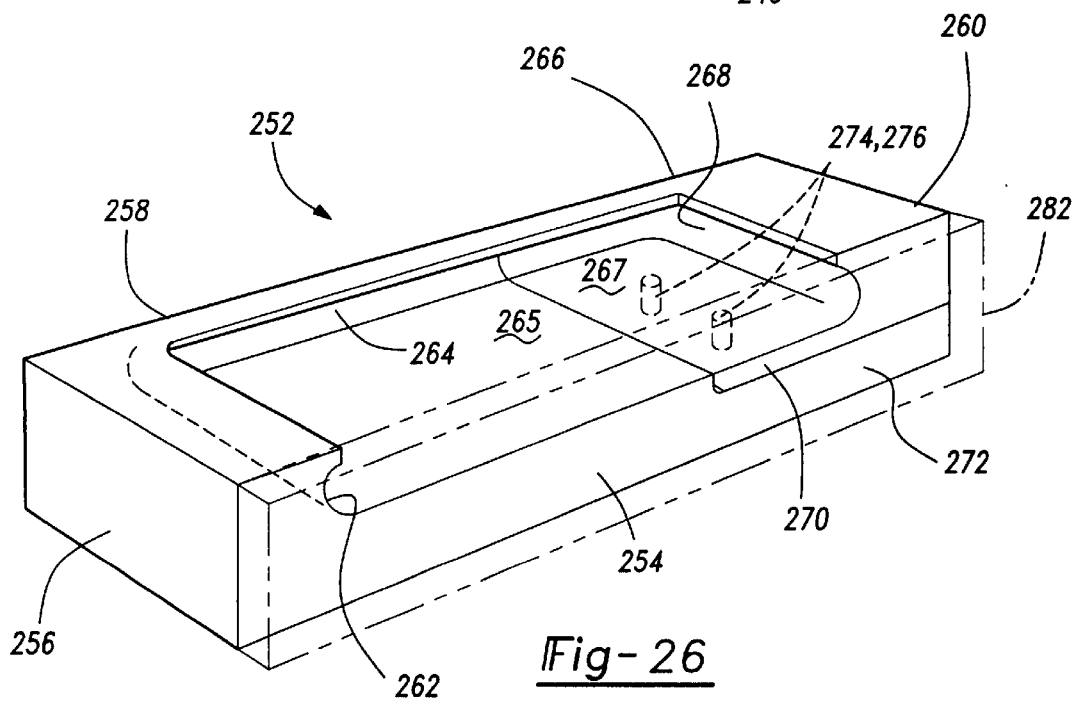
FIG. 26 is a perspective view of a mold assembly according to a further preferred embodiment of the present invention.
Figure 32:
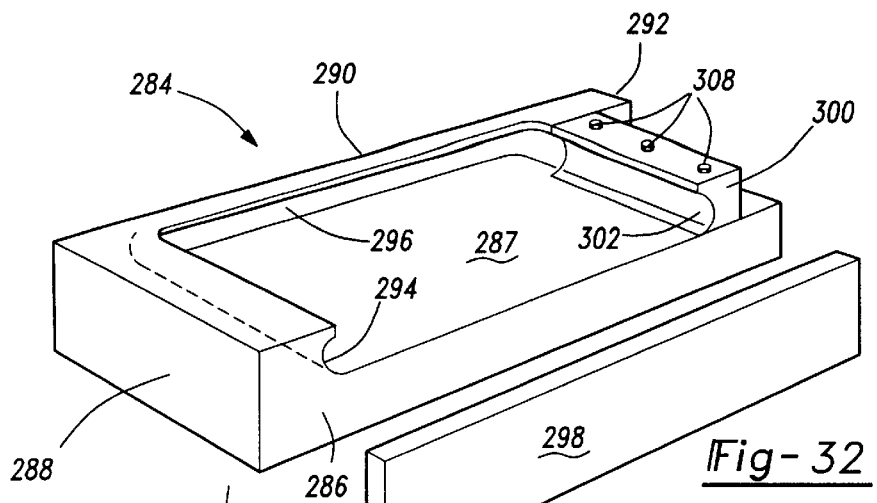
FIG. 32 is a perspective and assembled view of the mold assembly according to the further preferred embodiment of FIG. 29 and with attachable gate member illustrated in reduced view.

Referring now to FIGS. 26–28, a further preferred embodiment of a base construction is illustrated at 252 of a mold assembly according to the present invention and likewise is constructed in a rectangular shape with a first side 254, a second side 256, a third side 258 and a fourth side 260. As with the previously discussed embodiment 220 of FIGS. 23–25, the base construction 252 teaches a negatively configured mold defining enclosure which is formed in part by an inwardly facing and bull-nosed side 262 corresponding to the second side 256 and an interconnected bull-nosed side 264 corresponding to the third side 258 of the base construction and forms a central planar shaped area 265.

A releasably securable attachment portion 266 corresponds with the third side 260 of the mold body and is configured so as to provide a third interconnected and bull-nosed edge 268 as well as a portion of an upwardly facing bottom surface 267 of the overall mold defiling enclosure. Specifically, the attachment portion 266 includes the bull-nosed edge 268 and a projecting base portion 270 which are configured to permit the attachment portion 266 to be secured upon an underlying surface of a foundation portion 272 of the base and so that the central planar shaped area 265 smoothly aligns with the upwardly facing bottom surface 267 of the attachment portion 266.

Figure 37:
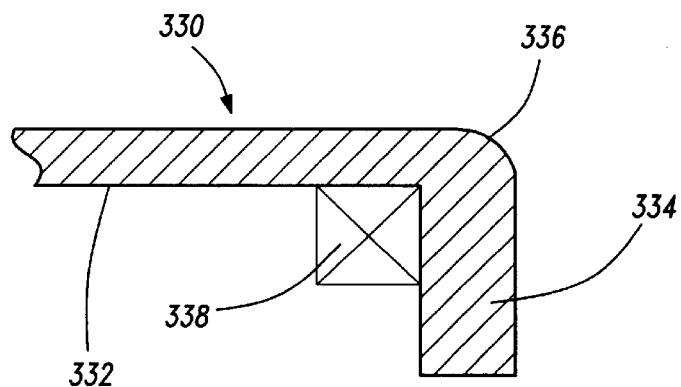
FIG. 37 is a side view of a veneered solid surface countertop product according to the preferred embodiment of the present invention.

FIGS. 26, 27 and 28 clearly illustrate the fashion in which the attachment portion is secured to the remainder of the mold base, specifically as shown by phantom illustration 266' of the attachment portion in FIG. 37, and it is envisioned that one such preferred variant will employ pins 274 projecting upwardly from the foundation portion 272 which seat within corresponding recesses 276 formed within an underside of the projecting base portion 270. It is also envisioned that the pins 274 can be deleted in favor of external securing means, such as latches 278 which are formed on opposite exterior faces of the attachment portion 266' (see FIG. 27) and enable the attachment portion 266' to be slidably engaged and disengaged with the main body portion of the mold base in a horizontal fashion such as along multi-directional arrow 280. The ability to remove the attachment portion in the manner illustrated facilitates quick and easy demounting of the veneer resin countertop product at the earliest point possible after it has been poured. A gate 282 is illustrated in phantom in the view of FIG. 26 and is securable to the mold base in the same fashion as previously explained in the preferred embodiment of FIGS. 23–25 to enclose the mold defining cavity and to establish a flat fourth edge for the veneer solid surface countertop product to be produced.

Referring now to FIG. 29, a mold assembly according to a further preferred embodiment is illustrated at 284 and includes a base with a rectangular shape and which likewise includes a first side 286, a second side 288, a third side 290 and a fourth side 292. A negatively configured mold defining enclosure is formed within the base 284 and includes a bull-shaped edge 294 corresponding to the second side 288 and a bull-shaped edge 296 corresponding to the third side 290. A planar shaped gate 298 (see FIGS. 29 and 32) is secured along the first side 286 in a manner consistent with that described in the previous embodiments of FIGS. 23–25 and FIGS. 26–28 to finish closing off the mold cavity defining a flat central area 287 and so as to provide a flat edge to the countertop product to be produced.

An elongated and planar shaped mold defining member 300 is shown which is capable of being releasably secured to the mold base and easily removable to facilitate quick demounting of the veneer solid surface countertop product to be produced. The mold defining member 300 includes a bull-nosed mold defining edge 302 which corresponds, upon placement of the member 30, with the fourth side 292 of the mold base. A plurality of apertures 304 are formed through the removable mold defining member 300 and, upon placement of the member 300 atop a platform portion 305 of the mold in the area of the fourth side and aligning apertures 306 formed within the underlying platform, a plurality of bolts 308 are threadably engaged to secure the removable member 300 to the associated fourth side 292 of the mold enclosure.

The advantage of the removable member 300 is that, upon sufficient gelling and curing of a veneer resin solid surface article produced within the mold, the planar shaped member 300 is capable of being unbolted and removed from the fourth side 292 to provide an additional gripping surface of the countertop product beyond the surface revealed by the removable gate 298 and to facilitate demounting. The removable member 300 is likewise capable of being shaped so that it may be secured within the mold defining enclosure at any longitudinal position between the parallel second side 288 and fourth side 292 in order to modify an overall length of a countertop product to be produced.

Finally, referring to FIGS. 33–36, a mold assembly is illustrated at 310 according to a yet further preferred embodiment and includes a rectangular shaped enclosure with a first side 312, a second side 314, a third side 316 and a fourth side 318. Unlike the previous described embodiments, the further preferred embodiment 310 of the mold assembly base is provided as an integrally formed structure in which the four sides are fixed portions of the mold base and enclose a central interior area 320 and which display a first mold defining edge 322 corresponding with the first side 312, a second mold defining edge 324 corresponding with the second side 314, a third mold defining edge 326 corresponding with the third side 316 and a fourth mold defining edge 328 corresponding with the fourth side 318.

Figure 33:
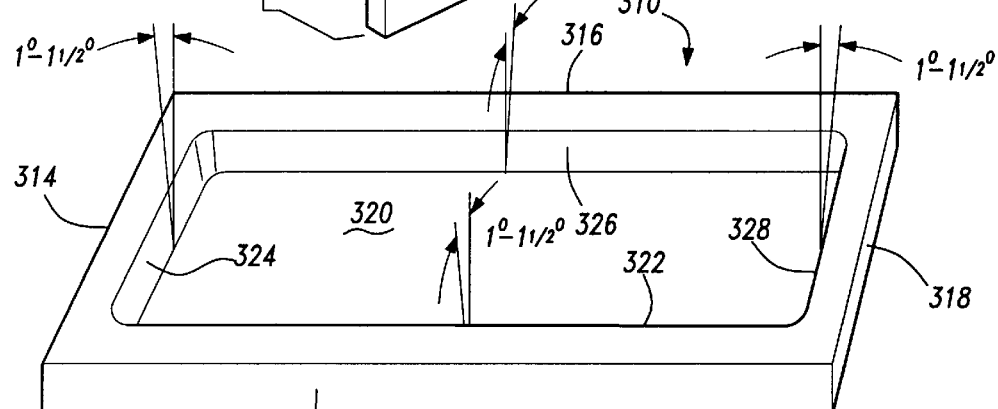
FIG. 33 is a perspective view of a further enclosed embodiment of the mold assembly according to the present invention.
Figure 34:
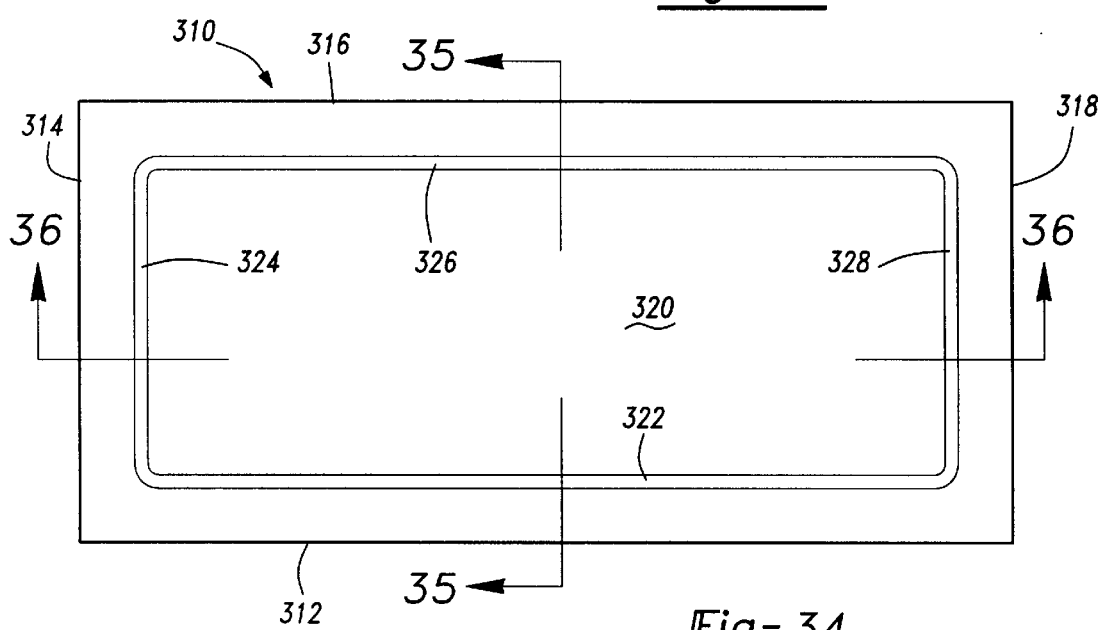
FIG. 34 is a top view of the mold assembly according to the further preferred embodiment of FIG. 33.
Figure 35:
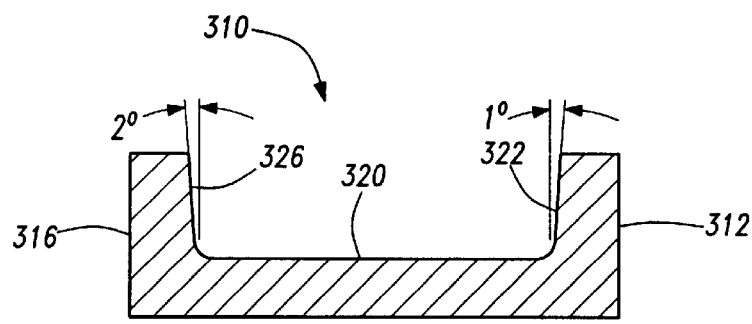
FIG. 35 is a cutaway taken along line 35—35 of FIG. 34 and illustrating front and rear draft angles associated with front and rear mold defining sides of the enclosed mold assembly according to the further preferred embodiment of the present invention.
Figure 36:
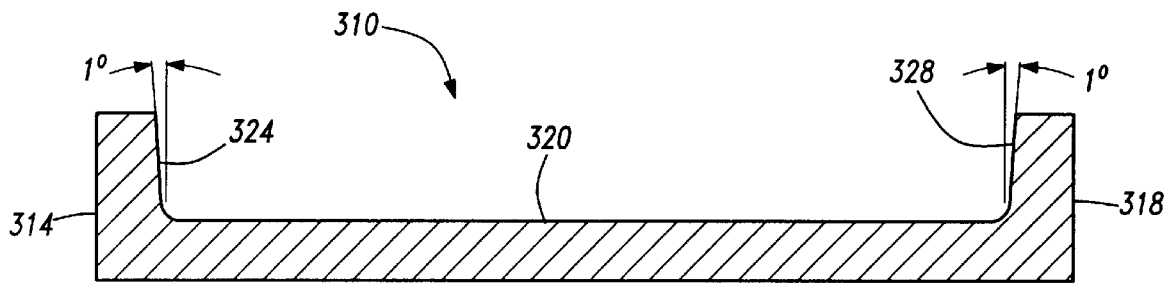
FIG. 36 is a cutaway view taken along 36—36 of FIG. 34 and illustrating side draft angles associated with mold defining sides of the enclosed mold assembly according to the further preferred embodiment of the present invention.

As is best viewed in the perspective view of FIG. 33 and the side cutaway views of FIGS. 35 and 36, each of the mold defining edges 322, 324, 326 and 328 are substantially straight in configuration, unlike the previously disclosed bull-nosed shapes in the other preferred embodiments, with the exception of a slight taper for facilitating subsequent demounting of the countertop product to be produced. Specifically, a slight vertical and outward taper of 2 degrees is formed along the third mold defining edge 326 and corresponds to a likewise vertical and outward taper of 1 degree to 1 and ½ degrees along the first mold defining edge 322. Likewise, additional vertical and outward tapers of 1 degree to 1 and ½ degrees are formed along the second mold defining edge 324 and fourth mold defining edge 328.

Upon curing and gelling of a veneer resin countertop product poured within the mold assembly 310, the built-up edges of the countertop product tend to pull away from their associated edges 322, 324, 326 and 328 and this is facilitated by the outwardly taper of the edges. The construction of the inwardly facing mold sides so that they exhibit flat edges with slightly outward tapers magnifies the degree of clearance between the edges of the countertop and the mold which occur as a natural phenomena during curing and gelling. The use of outwardly angled tapers of a small degree permit the insertion of a thin tool (not shown) or even the users fingertips to facilitate gripping and upwardly actuating demounting of the countertop product and without the need of removing sides of the mold structure as taught in the earlier preferred embodiments.

Referring to FIG. 37, a sample of a countertop product 330 produced according to the mold assembly 310 is shown and includes a central planar area 332 which terminates in a built-up edge 334. An outer and rounded corner 336 is provided between the built-up edge 334 and the central planar area 332 and this configuration is represented by an identical negative impression formed at the boundary between the inwardly facing mold defining edges and the upwardly facing and central area 320. It has been found in commercial use that an acceptable rounded and built-up edge can also be achieved with a mold enclosure such as disclosed at 310 and without the necessity of inwardly configured and bull-nosed shaped sides. Many of the preferred embodiments however desire the use of such bull-nosed sides.

Having described my invention, it should be apparent to one skilled in the art that the present invention teaches a novel and improved mold assembly for both producing a countertop article according to a standardized range of sizes and also facilitating demounting of a substantially cured countertop article in less time than which is normally required for complete curing of the countertop article as required by prior art assemblies. Additional preferred embodiments will also become apparent to those skilled in the art and include the planar shaped top being hingedly connected to a selected side of the mold base and which may be conveniently rotated from a non-use position downwardly into arrayed and suspended fashion over the base to complete the interior cavity which makes up the negative impression of the countertop article to be produced. It is also envisioned that the mold assembly could be modified to introduce a vacuum drawing process for facilitating application of the resinous substrate layer across the surface area of the interior cavity, such a process being known in the art as an alternative to pouring of the resinous substrate material.

Other additional preferred embodiment will be apparent without deviating from the scope of the appended claims:

I claim:

1. A mold assembly for creating a veneer solid surface countertop product displaying a built-up edge, said mold assembly comprising:

a substantially flat and planar shaped base bounded by a plurality of interconnected and upwardly extending sides, said sides each having a top edge surface and defining an interior cavity capable of receiving a pour of a resinous material;

a removable top arrayed upon said base and in overhead fashion relative to said interior cavity, said top including a plurality of outwardly facing perimeter edges which are spaced in inwardly and opposing fashion relative to opposing edges of a selected number of said plurality of interconnected sides, said outwardly facing perimeter edges of said removable top further including an alternating protecting and recessed pattern extending therealong, said pattern being adopted by a corresponding inner surface of the built-up edge of the countertop product produced within the mold and facilitating installation of the countertop atop a cabinet base, a plurality of spaced apart and outwardly extending suspension support members extending from outwardly facing perimeter edges of said removable top and engaging said top edge surfaces of said base for suspending said top within said interior cavity and above an upwardly facing surface of said base, the pour of resinous material filling a channel established between said outwardly facing perimeter edges of said top and said interconnected sides of said base to create the built-up edge of the countertop; and demounting means for facilitating faster removal of a cured countertop product from the mold assembly, said demounting means further including an outwardly tapered angle extending along said planar shaped sides of said base to establish a larger clearance between said sides and the corresponding outer edges of the countertop product during curing and gelling of the countertop product.

2. The mold assembly for creating a countertop product as described in claim 1, said planar shaped base including at least a first subsection and a second interengaging subsection, said demounting means further comprising first location means provided along a first interengaging edge of said first subsection and second location means along a second opposing and interengaging edge of said second subsection, said first and second location means permitting said first subsection to be separated from said second subsection following substantial curing of the countertop product.

3. The mold assembly for creating a countertop product as described in claim 2, said base further comprising a third subsection which is interengageable between said first and second subsections, said demounting means further comprising additional location means provided along opposite edges of said third subsection which are separably engageable with said first and second location means of said first and second subsections to establish a base with a desirable increased length.

4. The mold assembly for creating a countertop product as described in claim 3, said first location means further comprising pins projecting from said associated subsection edge in spaced apart fashion, said second location means comprising a like number of spaced apart and inwardly configured recesses within which said associated pins are received.

5. The mold assembly for creating a countertop product as described in claim 1, said demounting means further comprising a plurality of individual passageways arrayed around a perimeter of said base and communicating an exterior of said base with selected locations along said interior cavity.

6. The mold assembly for creating a countertop product as described in claim 5, further comprising a pressurized air supply capable of being fed through an air nozzle, said air nozzle being individually and successively inserted in said plurality of individual passageways and operable to feed volumes of said pressurized air which in turn cause release of surface contact between said outwardly facing edges of said substantially cured countertop and said mold base.

7. The mold assembly for producing a countertop product according to claim 1, further comprising fastening means for securing said top to said base, said fastening means including first and second pluralities of aligning apertures formed along said top and base, at least one of said first and second pluralities of apertures being internally threaded for receiving like threaded engaging bolts.

8. The mold assembly for producing a countertop product according to claim 7, said top further comprising a substantially funnel shaped and central aperture for permitting the creation of the countertop with a single resinous pour of material.

9. The mold assembly for producing a countertop product according to claim 1, said selected number of said plurality of interconnected sides of said base further comprising inwardly contoured edges to facilitate the creation of an outer bowl nose shape in the countertop.

10. The mold assembly for producing a countertop product according to claim 1, said planar shaped base further comprising a first side, a second side, a third side and a fourth side, a rectangular and planar shaped top being arrayed upon said base so that the countertop product produced thereby displays built-up edges along at least one of said first, second, third and fourth sides.

11. The mold assembly for producing a countertop product according to claim 10, said fourth side of said planar shaped base further comprising an elongate and flat edged gate which is selectively removable to permit axial and slidable removal of a substantially cured countertop article from said base.

12. The mold assembly for producing a countertop product according to claim 11, at least one of said first, second and third sides of said base further comprising inwardly configured surfaces for producing a countertop article having a bowl-nosed outer edge.

13. The mold assembly for producing a countertop product according to claim 11, said demounting means for facilitating faster removal of a substantially cured countertop product further comprising said first side and said third opposing and parallel extending side being incrementally and outwardly angled relative one another from a first interconnecting end with said second side to a second end interconnecting with said fourth side.

14. The mold assembly for producing a countertop product according to claim 10, further comprising a removable mold defining member arrayed along a selected side selected from said first, second third and fourth sides, said mold defining member being removed to reveal a bull-nosed edge of the veneer solid surface countertop to be produced.

15. A countertop product displaying a built-up edge produced by a novel process, said process comprising:

establishing a mold assembly having a substantially flat and planar shaped base with a plurality of interconnected and upwardly extending sides so as to define an interior cavity;

applying a surface coating of a resin based material to said planar shaped base and said plurality of interconnected and upwardly extending sides;

arraying a removable and planar shaped top upon said base in supporting fashion upon said sides and in overhead and suspended fashion relative to said interior cavity such that outwardly facing perimeter edges of said top are positioned in inwardly spaced and opposing fashion relative to a selected number of said plurality of interconnected and upwardly extending sides of said base so as to establish an outer perimeter channel surrounding said top;

introducing a volume of a resinous flowable material in a single pour within said interior cavity and said outer perimeter channel established between said base and said top to fill said interior cavity and to create a built-up edge around a perimeter of said cavity;

removing said top from said base;

permitting said flowable material to cure into a substantially hardened countertop product; and demounting said countertop product in substantially cured fashion from said mold.

16. The countertop product according to claim 15, further comprising the step of introducing an alternating pattern of projecting portions and recessed portions extending along an inner underside surface of said plurality of interconnected and upwardly extending sides which corresponds with the perimeter established by said built-up edge.

17. The countertop product according to claim 16, said countertop product exhibiting a rectangular shape with a first side, a second side, a third side and a fourth side, at least one of said sides exhibiting a bowl-nosed edge.

* * * * *

UNITED STATES PATENT AND TRADEMARK OFFICE
CERTIFICATE OF CORRECTION

PATENT NO. : 5,906,875
DATED : May 25, 1999
INVENTOR(S) : Robert Bordener

It is certified that error appears in the above-identified patent and that said Letters Patent is hereby corrected as shown below:

In the Abstract, line 10, delete "bowl" and insert --bull--.

Column 3, line 51, delete "off" and insert --of--.

Column 4, line 59, delete "16-16" and insert --17-17--.

Column 6, line 17, after "polygonal" insert --in--; and
        line 18, after "however" insert --it--.

Column 7, line 49, delete "72, 74 and 76" and insert --70, 72 and 74--;
        line 53, delete "9" and insert --10--;

line 66, delete "are" and insert --is--.

Column 8, line 34, delete "is provided";

line 56, delete "slided" and insert --slid--.

UNITED STATES PATENT AND TRADEMARK OFFICE
CERTIFICATE OF CORRECTION

PATENT NO. : 5,906,875

DATED : May 25, 1999

INVENTOR(S) : Robert Bordener

It is certified that error appears in the above-identified patent and that said Letters Patent is hereby corrected as shown below:

Column 9, line 32, delete "134" and insert --135--;

line 40, delete "136" and insert --137--;
line 44, delete "136" and insert --137--;
line 46, delete "136" and insert --137--;
line 55, delete "specific" and insert --reference--;
line 57, after "functioning" insert --as--; and
line 57, delete "their" and insert --the--.

Column 10, line 20, delete "136" and insert --137--;
line 28, delete "136" and insert --137--;
line 49, delete "bowl-nosed" and insert --bull-nosed--; and
line 54, delete "bowl-nosed" and insert --bull-nosed--.

Column 11, line 16, before "upwardly" insert --an--;
line 19, delete "bowl-nosed" and insert --bull-nosed--;
line 26, delete "applied" and insert --coated--;
line 52, delete "21" and insert --22--; and
line 64, after "pressurized" insert --air--.

Column 12, line 2, delete "natural" and insert --naturally--;
line 3, delete "phenomenom" and insert --phenomenon--;
line 34, delete "pneumatically" and insert --pneumatic--;
line 35, after "previously" insert --described--; and
line 62, delete "224" and insert --222--.

UNITED STATES PATENT AND TRADEMARK OFFICE
CERTIFICATE OF CORRECTION

PATENT NO. : 5,906,875

DATED : May 25, 1999

INVENTOR(S) : Robert Bordener

It is certified that error appears in the above-identified patent and that said Letters Patent is hereby corrected as shown below:

Column 13, line 19, delete "defiling" and insert --defining--;
        line 30, delete "37" and insert --27--;
        line 57, delete "bull-shaped" and insert --bull-nosed--; and
        line 58, delete "bull-shaped" and insert --bull-nosed--.

Column 14, line 5, delete "30" and insert --300--;
        line 10, delete "are" and insert --is--; and
        line 64, delete "users" and insert --user's--.

Column 15,
        line 55, delete "protecting" and insert --projecting--.

Column 16, line 67, delete "bowl-nosed" and insert --bull-nosed--.

Column 17, line 18, delete "bowl-nosed" and insert --bull-nosed--.

Column 18, line 34, delete "bowl-nosed" and insert --bull-nosed--.

Signed and Sealed this

Sixth Day of June, 2000

Q. TODD DICKINSON

*Attest:*

*Attesting Officer*      *Director of Patents and Trademarks*